Jan. 31, 1967 J. SUNNEN 3,300,865
BORE GAGE
Filed May 8, 1964 5 Sheets-Sheet 1

INVENTOR:
JOSEPH SUNNEN
BY Charles B. Haverstock
ATTORNEY.

INVENTOR:
JOSEPH SUNNEN
BY
Charles B. Haverstock
ATTORNEY

Jan. 31, 1967  J. SUNNEN  3,300,865
BORE GAGE

Filed May 8, 1964  5 Sheets-Sheet 3

INVENTOR:
JOSEPH SUNNEN
BY
Charles B. Haverstock
ATTORNEY.

Jan. 31, 1967  J. SUNNEN  3,300,865
BORE GAGE

Filed May 8, 1964  5 Sheets-Sheet 4

INVENTOR:
JOSEPH SUNNEN
BY
Charles B. Haverstock
ATTORNEY.

Jan. 31, 1967  J. SUNNEN  3,300,865
BORE GAGE

Filed May 8, 1964  5 Sheets-Sheet 5

INVENTOR:
JOSEPH SUNNEN
BY
*Charles B. Haverstock*
ATTORNEY,

# United States Patent Office 3,300,865
Patented Jan. 31, 1967

3,300,865
BORE GAGE
Joseph Sunnen, 400 S. Warwon Road,
Clayton, Mo. 63837
Filed May 8, 1964, Ser. No. 365,994
13 Claims. (Cl. 33—178)

The present invention relates generally to gages and like devices and more particularly to gages for measuring the size and accuracy of internal diameters and for comparing the sizes thereof. This invention is an improvement over the gages disclosed in Sunnen Patents Nos. 2,735,188, 2,785,473 and 2,803,886 of the same inventor.

An object of the present invention is to improve the operating mechanism and gaging means of existing gages.

Another object is to expand the range of gaging instruments used to measure and compare internal surfaces.

Another object is to provide gage means capable of rapidly and accurately measuring and comparing internal surfaces and the like.

Another object is to provide removable gage fingers for gages that measure internal surfaces and the like.

Another object is to provide improved means for mounting gaging fingers on a gage instrument.

Another object is to provide improved means for centralizing a gaging instrument in a bore to be gaged.

Another object is to provide portable gaging means with means thereon for controlling the gaging depth and range thereof.

Another object is to provide extremely accurate gage means which are rugged of construction yet relatively simple to operate.

These and other objects and advantages of the subject device will become apparent after considering the following detailed specification which covers a preferred embodiment of the subject device in conjunction with the accompanying drawings; wherein.

Figure 1:
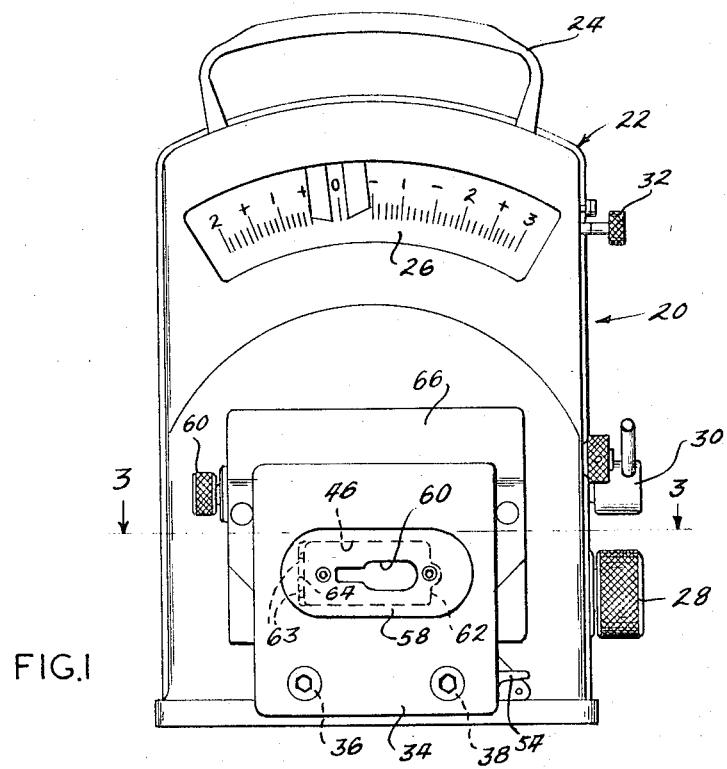
FIG. 1 is a front elevational view of a bore gage constructed according to the present invention.

Referring to the drawings more particularly by reference numbers, the number 20 in FIG. 1 refers to a bore gage constructed according to the present invention. The gage 20 has a main housing 22, a handle 24, a transparent window 26 with a scale and movable pointer visible therebehind, and certain control knobs and adjustment means which will be described later. Included among the adjustment means is a knob 28 which is used to adjust the setting of the gaging means employed, and also to lock and unlock certain replaceable gaging members employed on the gage, as will be described.

Another knob 30 is provided to lock a particular gage setting established by the knob 28 and to prevent loss thereof. This is done so that the same setting can be used repeatedly without readjustment. Another knob 32 is provided to center a movable dial pointer in a particular manner in order to establish a zero setting position with respect to the graduations on the scale visible behind the transparent window 26. This last setting provides means for determining how much a hole being gaged varies in diameter from a predetermined desired diameter.

Figure 5:
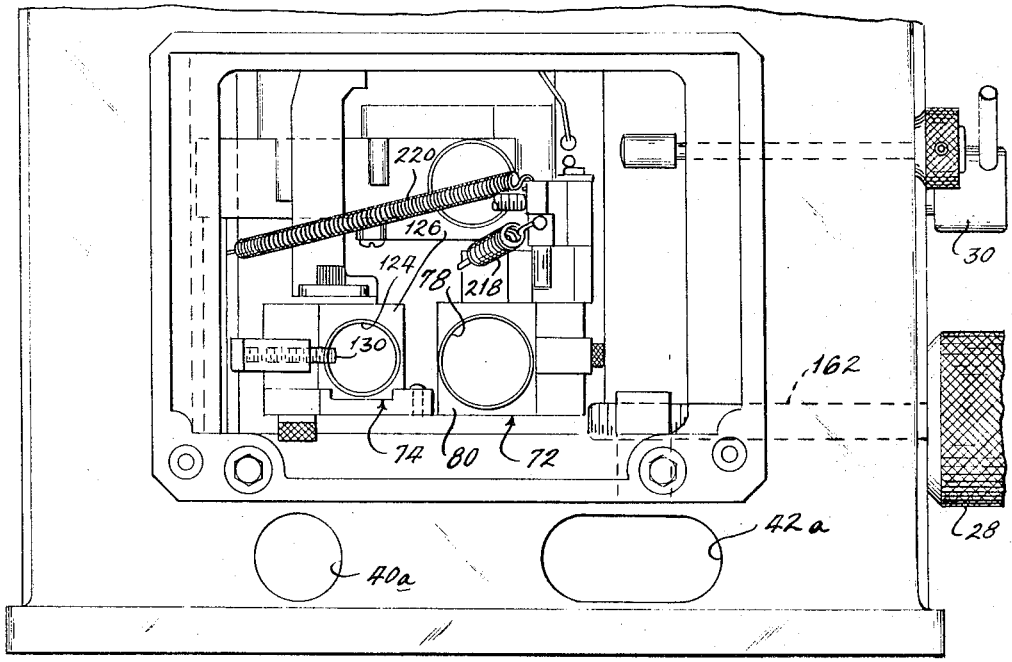
FIG. 5 is a fragmentary view taken on line 5—5 of FIG. 3 with the front cover removed.

A plate member 34 is positioned in front of the gage 20 and is mounted for front to rear adjustment by two spaced horizontal rod members 36 and 38. The plate 34 is attached to the rods 36 and 38 by threaded or other means, and the rods 36 and 38 extend longitudinally into the gage through holes 40a and 42a respectively. The holes 40a and 42a are positioned near the bottom of the gage (FIG. 5). The rod 36 also extends through a tubular member 40 that is positioned in the hole 40a. The plate 34 has several uses including being used in conjunction with a fixture for setting the gaging means to a particular diameter or hole size. Such a fixture is disclosed in Sunnen U.S. Patent No. 3,002,284. The plate 34 is also used during gaging operations to control the gaging depth, in which case the position of the plate is adjustable forwardly and rearwardly on the gage and can be locked in any fixed position within its range of movement or it can be allowed to move back and forth freely within a preselected range. The plate 34 also has an opening 46 through which the gaging means or fingers employed on the subject device extend as will be shown.

Figure 2:
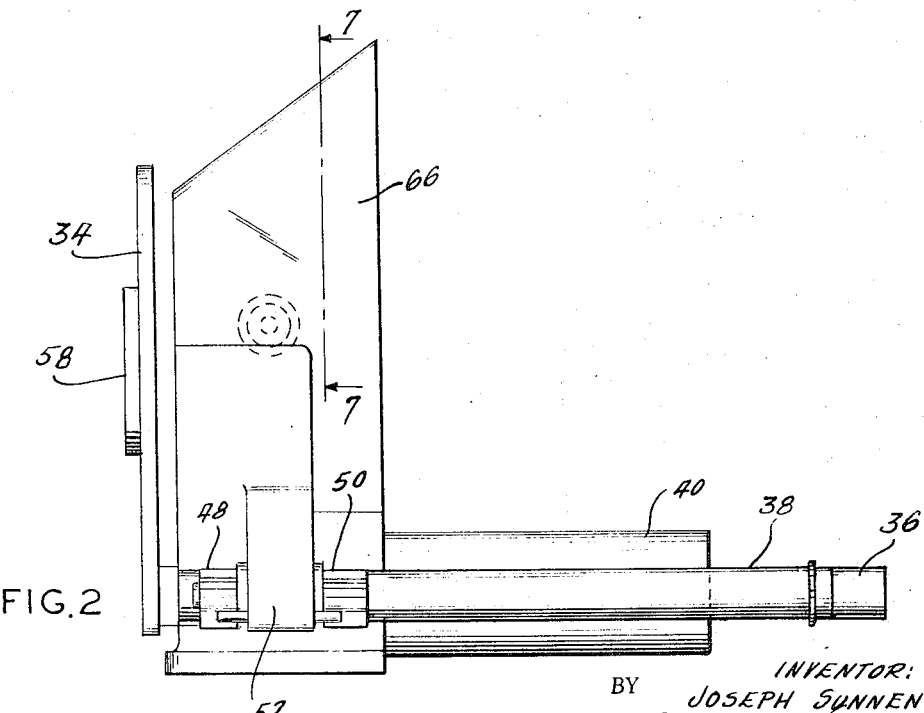
FIG. 2 is an enlarged fragmentary side elevational view of the front portion of the bore gage of FIG. 1.
Figure 8:
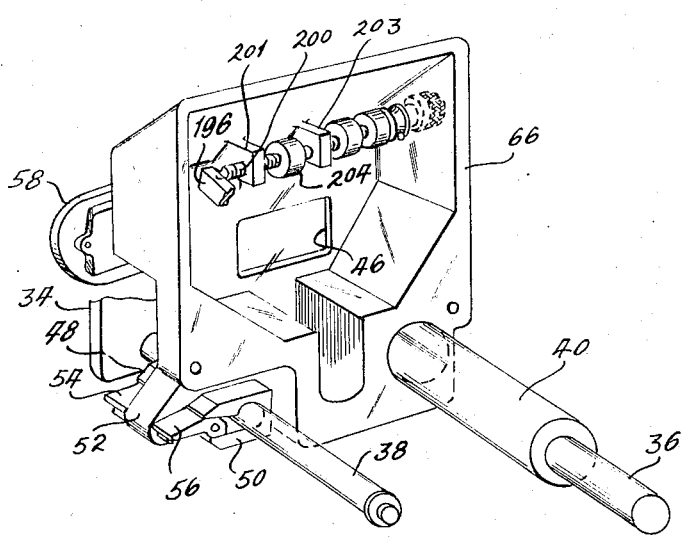
FIG. 8 is a rear view, in perspective, of the front cover and associated mechanism.

In order to lock the plate 34 in a fixed position or to allow it free or limited movement, the shaft 38 which is attached thereto is provided with two spaced locking devices 48 to 50 which are positioned on opposite sides of a fixed housing member 52 through the shaft 38 extends and moves (FIGS. 2 and 8). The locking devices 48 and 50 are similar in construction and are C-shaped to receive the rod 38 therethrough. In the locked condition the C-shaped members 48 and 50 resiliently engage or are clamped onto the rod 38 and move therewith. Each of the C-shaped clamps 48 and 50 are open on one side and the openings are defined by spaced flat surfaces. Operator members 54 and 56 are pivotally mounted on suitable studs on each side of the housing member 52 and each operator member has a portion which extends respectively into the openings in the associated C-shaped members and cooperates with the adjacent flat surface to move the C-shaped members from a locked condition engaging the rod 38 to an open or unlocked condition permitting the rod 38 to freely slide therethorugh. Each operator member also includes an outwardly extending portion which is moved up or down to lock and unlock the associated C-shaped member on the rod 38. In the down positions of the operator members 54 and 56 the open side of the C-shaped members are not spread apart and therefore they are resiliently clamped onto the rod 38. In the up positions of the members 54 and 56, on the other hand, the open sides of the C-shaped members are spread apart and therefore are unlocked so that the rod 38 can freely move therethrough. When both operators 54 and 56 are up the plate 34 is freely movable toward or away from the housing. Also in the unlocked condition the C-shaped members 48 and 50 remain engaged with the associated operators 54 and 56 and therefore do not move with the rod 38 as they do when clamped. In similar manner, when one C-shaped member is clamped on the rod 38 and the other not, or when the C-shaped members are clamped on the rod a further distance apart than the thickness of the housing member 52, movement of the plate 34 can be restricted to a predetermined range. When both clamps 48 and 50 are locked on the rod adjacent opposite sides of the fixed housing member 52, however, the plate remains in a predetermined non-movable position. The locking means for the plate 34 therefore provides means for accurately controlling the extension of the gaging means employed and hence also control the gaging depth or range of depth.

Figure 3:
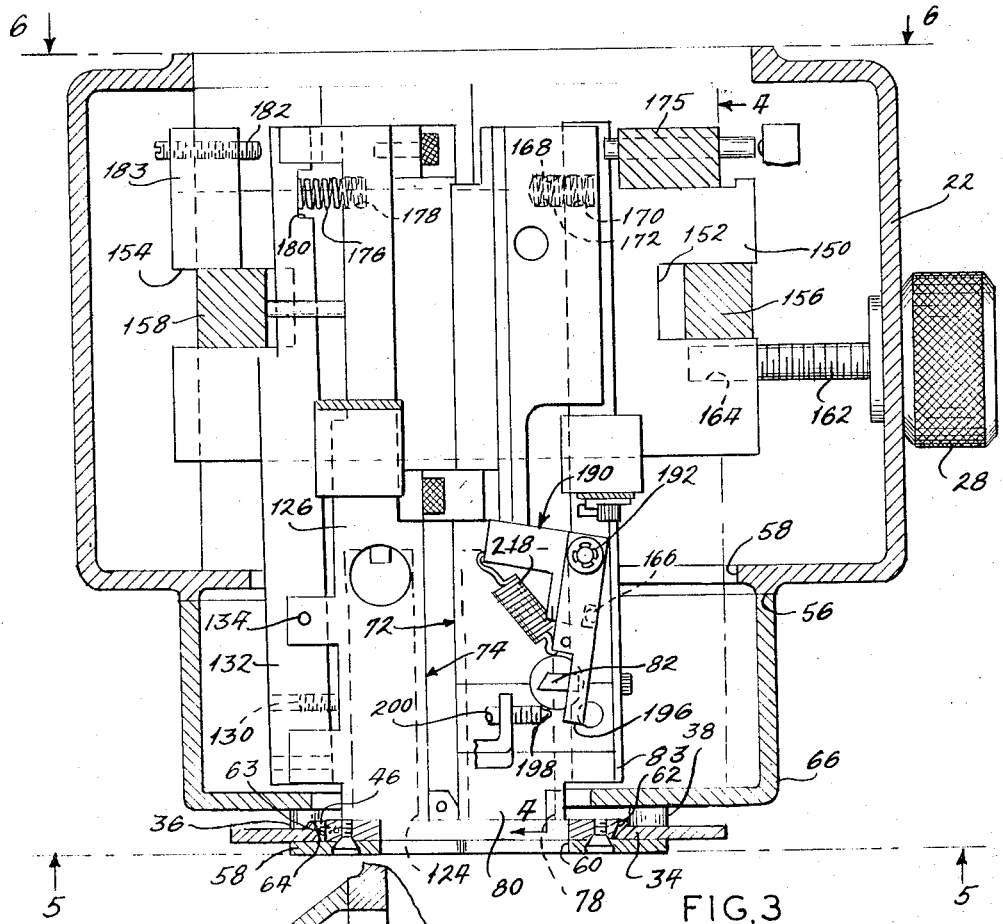
FIG. 3 is a cross-sectional view taken on line 3—3 of FIG. 1.

Depending on the diameter of a hole to be gaged and the size of the gaging means employed, a second plate member 58 may also be mounted in front of the plate 34 as shown in FIGS. 1 and 3. The second plate 58 has a smaller opening 60 therethrough than the opening 46, and the plate 58 is mounted on the plate 34 by cooperation between a beleveled edge 62 thereon and a beveled edge of the opening 46. The plate 58 also has one or more spring biased balls 63 on the opposite side thereof from the beveled edge which cooperates with another beveled edge 64 of the opening 46 to hold the member 58 on the member 34. The smaller plate 58 is optional and is included to provide support and backing when gaging relatively small parts.

The plates 34 and 58 are positioned in front of a separate forwardly extending gage housing portion 66 which is attached to the front of the main gage housing 22 by means of screws or other fasteners. The housing portion 66 forms a closure for the front of the gage and for around the gaging means which extend therethrough. The housing 66 also supports centralizing adjustment means which will be described later.

Two relatively movable gaging assemblies or fingers 68 or 70 are employed at one time on the gage 20 and they extend forwardly through the housing portion 66. The finger assemblies 68 and 70 are installed in mounting assemblies 72 and 74 respectfully which are parts of the gage itself (FIGS. 3 and 5). The assemblies 72 and 74 and the finger assemblies installed therein are relatively movable for gaging purposes as will be shown. The details of the finger assemblies 68 and 70 are shown in FIGS. 9–16. It is to be understood, however, that a plurality of similar finger assemblies can be installed for use on the same gage 20 to cover the full range of bore sizes without sacrificing accuracy.

The finger assembly 68 (FIGS. 9–12) includes a tubular body portion 76 which slides into a bore 78 in a member 80 that is part of the mounting assembly 72 (FIGS. 3 and 5). The tubular body 76 also has a cut out 84 on one side with a flat portion 86 which is used to accurately orient the assembly 68 in the bore 78. In order to be able to install the finger assembly 68 in the bore 78 it is first necessary to turn the knob 28 (FIG. 1) to a predetermined non-gaging portion near one end of its travel. In this position the gage is inoperative for gaging purposes and the finger assembly 68 can be installed or removed from the bore 78 by sliding it endwardly therein. After the finger assembly 68 is positioned in the bore 78 further rotation of the knob 28 toward the gaging condition will lock it therein. The finger assembly 68 is locked in position in the bore 78 by means of a locking member 82 (FIG. 3) which is mounted on another member 83 that is part of the finger mounting assembly 72. The member 83 is pivotally connected to the member 80 as will be shown, and in the operating condition of the gage the member 82 is spring biased against the flat surface 86 (FIGS. 9 and 11) formed on the body portion 76 of the finger assembly 68. The surface 86 and the member 82 are both accurately formed to properly angularly orient the finger assembly 68 in the bore 78. The body portion 76 of the finger assembly 68 also has two spaced and accurately formed round lands 88 and 90 which cooperate with the surface of the mounting bore 78 to prevent looseness therebetween.

The finger assembly 68 includes a gaging portion 92 which extends forwardly from the front of the gage and which also has another portion which extends through the tubular member 76. The gaging portion 92 has a longitudinal groove 94 along one side which receives a mating gaging portion 96 of the other gaging finger assembly 70. The groove 94 is formed along the same side of the gage portion 92 as another larger groove 98 formed along the side of the body portion 76. The groove 98 provides clearance which enables either finger assembly 68 or 70 to be installed or removed individually by preventing interference therebetween.

Figure 11:
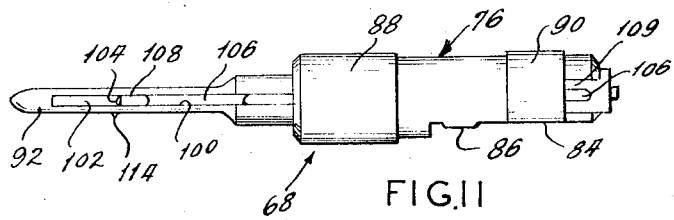
FIG. 11 is a top view of the gaging finger of FIG. 9.
Figure 12:
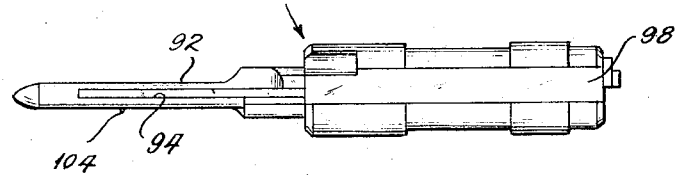
FIG. 12 is a view of the other side of the same gaging finger as seen in FIG. 9.
Figures 13, 14:
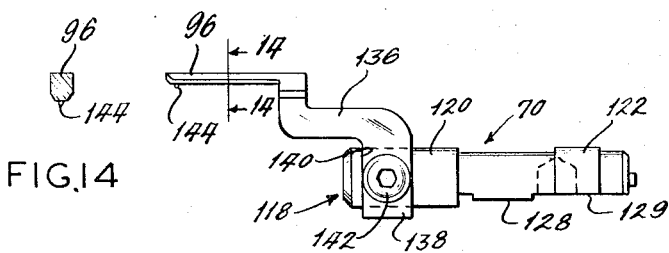
FIG. 13 is a bottom view of another replaceable gaging finger employed on the subject bore gage.
FIG. 14 is an enlarged cross-sectional view taken on line 14—14 of FIG. 13.
Figure 15:
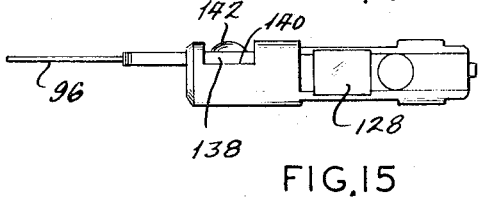
FIG. 15 is a side elevational view of the gaging finger of FIG. 13 as seen from the bottom therein.
Figure 16:
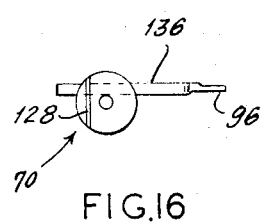
FIG. 16 is an end view of the finger of FIG. 15 as seen from the right therein.

The gaging portion 92 of the assembly 68 also has another longitudinal groove 100 formed therein at approximately 90° from the groove 94 (FIG. 11). The groove 100 extends substantially the full length of the portion 92 and the forward end thereof has a resilient bendable member 102 positioned therein. The bendable member has its forward end fixedly attached to the gaging portion 92 adjacent to the forward or free end thereof, and the opposite or free end of the bendable member 102 extends toward the body 76 and has a hard gaging point 104 attached to the outer surface thereof. An elongated rod 106 is also positioned in the groove 100 and it has a beveled end portion 108 which is positioned extending in the groove under the free end of the bendable member 102. The rod 106 also extends along the groove 100 through the body 76 and is spring biased by spring means located in the body into a rightward or retracted position as seen in FIG. 11. The rear end of the rod 106 is accessible in a body cut out 109 for cooperation with adjustment means which are provided to move the rod longitudinally in the groove 100 to adjust the radial position of the gaging point 104. The adjustable gage point 104 is provided to centralize the gaging means in a hole being gaged as will be described later.

The gaging portion 92 is positioned extending through the body 76 and is locked in position therein by means of set screws 110 (FIG. 9) which engage a flat surface 112 formed thereon. In addition to the adjustable centralizer gage point 104, the gage member 92 also has another hard gage point 114 fixedly located thereon at approximately 90° from the point 104 in the same plane through the member 92. During operation of the gage the point 114 is located on a horizontal diameter of the gaging member 92 and the centralizer point 104 is located at or near the top thereof.

The finger assembly 70 (FIGS. 13–16) has a generally cylindrical body portion 118 with spaced round lands 120 and 122 thereon which mate with the round surface of a bore 124 in mounting member 126 of the assembly 74 (FIGS. 3 and 5). The body portion 118 also has an accurately formed flat surface 128 formed on a cut out portion 129 thereof, and the flat 128 cooperates with a locking member 130 carried on a member 132 which is pivotally connected to the member 126 by a pivot shaft 134. Relative movement between the members 126 and 132, like relative movement between the members 80 and 83 of the mounting assembly 72, is also under control of the knob 28.

The assembly 70 also includes a gaging element 136 which is attached to the body portion 118 thereof by means of a portion 138 which is positioned in a transverse body groove 140 (FIG. 13) and secured therein by means of threaded member 142. The gaging element 136 also includes the gage portion 96 which is movable positioned in the groove 94 in the gage member 92. The gage portion 96 also has a hard gaging point 144 mounted thereon, and the gaging points 144 and 114 are located on opposite sides of the gage members 92 and 96 during gaging operations. The spacing of the points 114 and 144 is also adjustable by the knob 28 and is set during gaging to measure the diameter of a hole. Before being used for gaging, however, the position of the centralizer point 104 must be adjusted as will be shown.

The three hard bore engaging points 104, 114 and 144 are spaced at approximately 90° intervals during gaging, and two are located on opposite sides of the assemblies 68 and 70, and the third is located on top of the assembly 68. During a gaging operation all three points are adjusted to simultaneously engage the surface of a hole being gaged. The two horizontally oriented points 114 and 144 measure the diameter of the hole and the third point, point 104, engages the top of the hole and is used to centralize the other two points on a true diameter thereof. This is done by adjusting the radial position of the point 104 until a maximum reading is obtained for the other two points 114 and 144. A maximum reading occurs only when the other two points are on a diameter of the hole. Since there is only one maximum reading position for any round hole, any radial movement of the point 104 when the points 114 and 144 are on a true diameter will reduce the space therebetween.

Many different sizes but similarly constructed pairs of gaging finger assemblies similar to the assemblies 68 and 70 can be used on the same gage 20 to expand the range thereof. Each different set of gaging fingers should be designed and constructed, however, to cover a different range of hole sizes since no one set can cover the full range because of limitations imposed by the location of the centralizer point 104. Each set or pair of finger assemblies, however, will cover all possible hole diameters within the range thereof. This is possible because the finger assemblies are horizontally movable relative to each other to change the spacing between the horizontal points 114 and 144. This is obtained by means of the knob 28 as will be shown. The knob 28 therefore serves principally two important purposes on the subject improved gage, namely, (1) it provides means by which the finger assemblies can be installed and locked in operative positions or removed from the gage, and (2) it provides means for adjusting the spacing between the points 114 and 144 by moving the two assemblies relative to each other.

In FIG. 3 the mounting members 80 and 126 are shown in top plan view and it can be seen that both mounting members 80 and 126 extend from adjacent the front to adjacent the rear of the gage. The mounting bores 78 and 124 in the mounting members are also both accessible at the front of the gage for installing and removing the associated finger assemblies 68 and 70. This is done through a suitable opening in the front housing 66 and through the opening 46 in the plate 34 when the plate 58 is removed.

Figure 6:
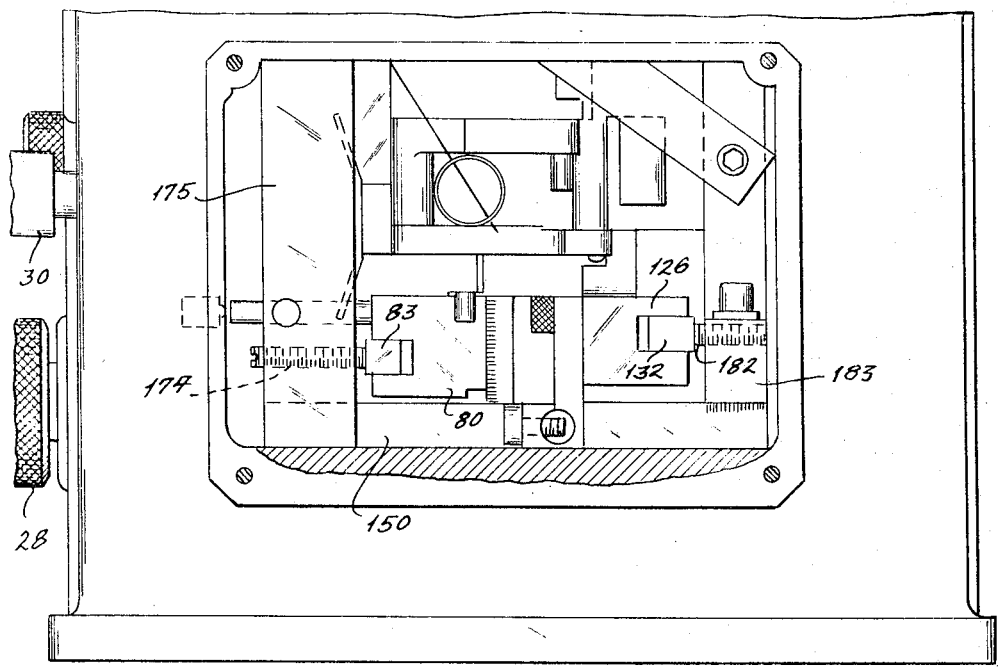
FIG. 6 is a rear elevational view taken on line 6—6 of FIG. 3.

The mounting member 80 is attached to a horizontal support member 150 (FIG. 3) which extends substantially across the width of the gage near the bottom thereof. The member 150 has notches 152 and 154 formed in the side edges thereof which cooperate respectively with spaced fixed posts 156 and 158 in the gage. The knob 28 is journaled in the main gage housing 22 and has a threaded shaft 162 which cooperates with a threaded bore 164 in the support member 150. When the knob 28 is turned the support member 150 will move sidewardly in the gage. This also moves the mounting member 80 transversely. The mounting member 80 is also pivotally connected to the member 83 by a pivot shaft 166 and the member 83 carries the locking member 82 thereon. The members 80 and 83 also have aligned counter-bores 168 and 170 respectively located near their rear ends in which a compression spring 172 is positioned. The compression spring 172 urges the rear end of the member 83 away from the rear end of the member 80 which also moves the locking member 82 inwardly relative to the bore 78 for locking engagement with the surface 86 on the finger assembly 68 (FIG. 11). However, when the knob 28 is rotated to move the members 80 and 150 to the left as seen in FIG. 6, the rear end of the member 83 will move against a fixed but adjustable stop screw 174 which is positioned in a bore in a fixed support member 175. Further movement in the same direction will compress the spring 172 and will pivot the member 83 counterclockwise relative to the pivot shaft 166 as seen in FIG. 3. This in turn will move the locking member 82 outwardly relative to the mounting bore 78 to release the finger assembly 68 so that it can be withdrawn frontwardly from the mounting bore 78.

In like manner the locking member 130 for the mounting assembly 74 is pivotal about the shaft 134 (FIG. 3) and is biased into a locking position with the finger assembly 70 by means of another compression spring 176 which is positioned in a bore 178 in the member 126 and in an aligned bore or groove 180 in the member 132. A screw or other stop 182 positioned in a post 183 carried on the member 150 moves against the rear end of the member 132 at about the same position of the member 150 as when the member 83 moves against the stop member 174. In this case, however, the mounting member 126 is fixed, and therefore further movement of the member 150 operates to pivot the member 132 clockwise as seen in FIG. 3 in a direction to move the locking member 130 away from its locking position engaging the surface 128 on the assembly 70. This frees the assembly 70 and enables it to be withdrawn from the mounting bore 124. It should also be noted that the locking means for the finger assemblies release the finger assemblies when they are in their most spread apart positions which is advantageous because it makes their removal and installation easier and prevents possible interference between the finger assemblies. Movement of the support member 150 also moves the gage finger assembly 68 horizontally relative to the gage finger assembly 70 since one assembly is fixed and the other is not. This changes the horizontal space between the gage points 114 and 144.

When a set of finger assemblies are installed and in operating position as determined by setting the knob 28, it is also necessary, as already stated, to centralize the points 114 and 144 in a hole to be sure that they are on a true diameter thereof. This involves adjusting the radial position of centralizer point 104. The mechanism for adjusting the position of the centralizer point 104 is shown in FIGS. 1, 3, 4, 5, 7 and 8.

Figure 4:
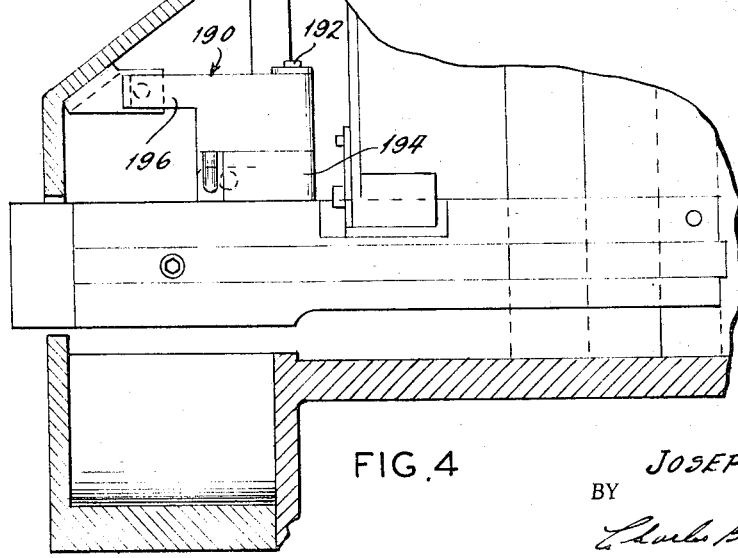
FIG. 4 is a fragmentary cross-sectional view taken on line 4—4 of FIG. 3.
Figure 7:
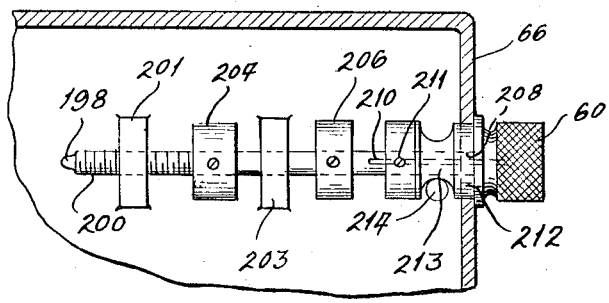
FIG. 7 is a fragmentary cross-sectional view taken on line 7—7 of FIG. 2.
Figure 9:
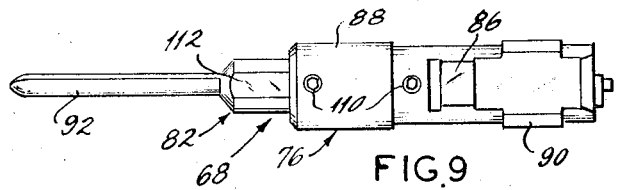
FIG. 9 is a side elevational view of a typical replaceable gaging finger employed on the subject device.
Figure 10:
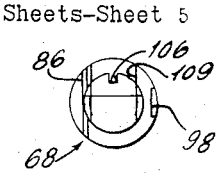
FIG. 10 is a right end view of the gaging finger of FIG. 9.

Referring to FIGS. 3 and 4, an assembly 190 is shown pivotally mounted on a vertical shaft 192 which is attached to the mounting member 80. One end of the assembly 190 has a downwardly extending portion 194 (FIG. 4) which extends into the mounting bore 78 and into the cut out portion 109 at the rear of the assembly 68. The downwardly extending portion 194 engages the rear end of the rod 106 which controls the radial position of the centralizer point 104. The assembly 190 also has a forwardly extending portion 196 which engages a rounded end 198 of an adjustment member 200 (FIGS. 3, 7 and 8). The adjustment member 200 is threaded over a portion adjacent the end 198 and extends through a threaded hole in a boss 201 which is attached to the front housing portion 66. A second boss 203 with a non-threaded hole therethrough slidably receives a non-threaded portion of the member 200. A collar 204 is mounted on the member 200 between the bosses 201 and 203 and limits longitudinal movement of the member 200 in one direction by engaging the boss 203. A second collar 206 is also mounted on the member 200 on the opposite side of the boss 203 and limits longitudinal movement of the member 200 in the other direction. The rod member 200 also extends through a bore 208 in the knob 60, and the rod 200 has a longitudinal groove 210 that slidably cooperates with a pin 211 in the knob 60 to prevent relative rotational but not longitudinal movement therebetween. The knob 60 is also rotatably mounted in the housing portion 66 by means of an annular shoulder 212 which cooperates with a hole in the housing. A portion of the knob 60 that extends into the housing 66 also has an annular round bottom groove 213 which cooperates with bolt 214 used for fastening the housing portion 66 onto the gage. The bolt 214 prevents the knob 60 from coming out. When the knob 60 is turned, the rod member 200 will also rotate and will also move longitudinally between end positions defined by the collars 204 and 206. These longitudinal movements of the member 200 will also rotate the assembly 190, and will in turn change the position of the rod member 106 (FIG. 11) in the assembly 68 and hence the radial position of the gage point 104. For example, when the assembly 190 rotates counter-clockwise (FIG. 3) the downwardly extending portion 194 thereof will move the rod 106 frontwardly so that its beveled surface 108 will move further under the bendable member 102 to cause the point 104 to move radially upwardly. Conversely, when the assembly 190 move clockwise the point 104 will move downwardly. The purpose of this adjustment, as already mentioned, is to centralize the other two gaging points 114 and 144 in a hole so that they are on a true diameter thereof which is indicated by a maximum gage reading. The assembly 190 is also biased by one or more springs such as the springs 218 and 220. The spring 218 is connected between two relatively movable parts of the assembly 190 as a safety device to prevent excessive loads on the point 104, and the spring 220 is provided to maintain the assembly in a clockwise position against the member 200.

The rear ends of the gaging finger assemblies 68 and 70 are also provided with accurately formed rear surfaces which limit rearward movement thereof into the gage. This is done to assure that all of the gage points are in the same plane when installed. Adjustment of these surfaces is usually made at the factory.

Once a set of gaging finger assemblies 68 and 70 is installed, the knob 28 is used to adjust the distance or spacing between the points 114 and 144. This can be done using an accurately formed ring cage or using a setting fixture such as that disclosed in Sunnen U.S. Patent No. 3,002,284. A ring cage is limited because it can only be used to set a particular dimension while the fixture disclosed in the cited patent can be used to adjust the spacing between the points 114 and 144 to any spacing within the range thereof. Once the knob 28 has been set to a particular position, that position can be retained as long as necessary by means of a locking device under control of the knob 30 (FIGS. 1, 5 and 6). The locking device may be of a known construction. The centralizing knob 60 is also used to centralize the points 114 and 144 on a diameter of a ring gage or other hole being measured.

The finger assemblies, their mountings, the means for locking the fingers in the mounting, and the centralizing means are all important improvements and all provide means for greatly expanding the range of bore sizes that can be gaged using a single gage and a plurality of sets of replaceable gaging finger assemblies. Gaging fingers of the type disclosed have been used to gage extremely small diameter bore sizes and also to gage relatively large bore sizes and in all cases with extreme accuracy to within a few millionths of an inch. This has not been possible heretofore with any known gaging devices and with anywhere near the same accuracy. Furthermore, there has not heretofore been any known means for accurately adjusting and controlling the gaging depth or range of gaging depth such as are provided by the locking devices described above which control the position of the plate member 34.

There has thus been shown and described novel improvements in gaging means and the like which greatly increase the flexibility and utility thereof and which do so without sacrificing accuracy. Furthermore, the subject improvements greatly expand the range of hole sizes that can be gaged using the same gage, and they also fulfill all of the objects and advantages sought therefor. Many changes, modifications, alterations and other uses and adaptations of the subject improvements, however, will become apparent to those skilled in the art after considering this specification and the accompanying drawings. All such changes, modifications, alterations and other uses and applications which do not depart from the spirit and scope of the invention are deemed to be covered by the invention which is limited only by the claims which follow.

What is claimed is:

1. In a gage device for measuring and comparing bores and the like the improvements comprising a gaging mechanism, a set of gaging members, means for cooperatively mounting said gaging members on said gaging mechanism including means for adjusting the relative positions thereof, each of said gaging members including at least one bore engaging element positioned respectively thereon to engage opposite sides of a bore being gaged, and a second bore engaging element mounted on one of said gaging members to engage the bore at a location around the bore intermediate between the aforesaid bore engaging elements, and means for adjusting the position of said second element on the said one gaging member to centralize the aforesaid elements in the bore so that they measure a diameter thereof said last named means including yieldable means normally urging said second element into a retracted position on said one gage member, and adjustable means on the gage device operatively engageable with said yieldable means for changing the position of said second element on said one gaging member.

2. In a gage device defined in claim 1 means are provided on the gage for automatically releasing said gaging members from the mounting means therefor in a preselected position thereof whereby said members can be removed and replaced by other similar gaging members.

3. In the gage device defined in claim 2 said means for releasing the gaging members include means on the gaging mechanism for accurately and cooperatively orienting said members on the gage device.

4. In a device for gaging internal surfaces and the like comprising a gage, a pair of relatively movable gaging members mounted on said gage, each of said gaging members having an element thereon for engaging an internal surface being gaged, one of said surfaces engaging elements on each member being positioned to engage opposite ends of a diameter of the internal surface being gaged, means for moving one of said gaging member relative to the other gaging member to change the distance between said opposed surface engaging elements, a second surface engaging element mounted on one of said members for engaging the surface being gaged at an intermediate location between said opposed elements, all of said surface engaging elements being arranged to be substantially in the same plane, means for changing the position of said second element relative to the surface engaging element on said one gaging member to thereby change the position at which the opposed elements engage the surface being gaged, said last named means including yieldable means supporting the second element on said one gaging member, and means for controlling the distance the surface engaging elements can move into an internal surface being gaged.

5. A bore gage comprising a pair of gaging assemblies, means on the gage for mounting said assemblies in cooperative positions, each of said gaging assemblies having at least one bore engaging element thereon in position to engage opposite sides of a bore being gaged, a second bore engaging element mounted on one of said assemblies to engage the bore at a location therearound that is approximately equidistant from the aforesaid opposed bore engaging elements, means for adjusting the position of said second bore engaging element on said one assembly in order to relocate and centralize the opposed bore engaging elements in the bore being gaged, said adjustment mean including cooperating members one of which is attached to the said one assembly and the other of which is a member having a beveled surface engageable with said attached member and movable relative thereto to change the position of said second bore engaging element relative to the said one assembly, and adjustment means on the gage cooperatively engageable with said other member to adjust the position thereof and also the position of said second bore engaging element.

6. A bore gage for gaging internal surfaces and the like comprising a gage mechanism capable of indicating visually the condition of an internal surface being gaged, a pair of relatively movable mounting members operatively connected to said gage mechanism, a gage assembly mounted on each of said relatively movable mounting members, each of said gage assemblies having a surface engaging element thereon to engage substantially opposite sides of an internal surface being gaged, a second surface engaging element including means movably mounting said second surface engaging element on one of said gage assemblies for engaging the surface being gaged at a location intermediate between said opposed surface engaging elements, all of said surface engaging elements being in a plane substantially normal to the axis of the internal surface being gaged, and means for changing the relative positions of said surface engaging elements, said last named means including means for changing the distance between the opposed surface engaging elements and other means including adjustment means in the gage mechanism engageable with movable mounting means for said second surface engaging element for repositioning the second surface engaging element on said gage assembly.

7. The bore gage defined in claim 6 wherein means are provided for orienting and locking the gage assemblies in preselected cooperating positions in the respective mounting members, said means including abutment means in the mounting members and other means movable into abutment with the gage assembly during adjustment of the gage mechanism.

8. In a device for measuring the surface accuracy and diameter of a bore or other internal surface, the improvements comprising a gage including a gaging mechanism, a pair of relatively movable mounting assemblies operatively connected to the gaging mechanism and movable to indicate surface accuracy and bore diameter, a gaging finger assembly mounted respectively in each of said relatively movable mounting assemblies, means for adjusting the relative positions of said relatively movable mounting assemblies and of the gaging finger assemblies mounted therein, each of said gaging finger assemblies including an elongated portion having a bore engaging element at least one of which is located at an intermediate location therealong, said bore engaging elements being located on said gaging fingers so as to engage substantially opposite sides of an internal surface being gaged, a second surface engaging element mounted on one of said gaging fingers for engaging the surface being gaged at a location intermediate between the aforesaid opposed surface engaging elements, means for adjusting the space between the opposed surface engaging elements, other means for adjusting the position of the second surface engaging element relative to the associated gaging fingers so that all of said elements simultaneously engage said surface and wherein said opposed elements are on opposite ends of a diameter of the surface, and means on the gage for controlling the depth to which the said surface engaging elements can be moved into an internal surface being gaged.

9. In the device defined in claim 8 said means controlling the depth to which the surface engaging elements can be moved into an internal surface to be gaged includes a plate having an opening therethrough through which the finger assemblies extend, and means for adjusting the position of the plate relative to the finger assemblies including sliding connection means connecting the plate to the device, and a pair of spaced locking members engageable with said sliding connection means, each locking member of said pair being capable of restricting movement of the plate in one direction.

10. Gaging means for use on bore gages and the like comprising a pair of relatively movable gage finger assemblies each including a mounting portion and a gaging portion, said gaging portions cooperating during gaging operations and each of said gaging portions having a bore engaging element which elements are positioned to engage opposite sides of an internal surface being gaged, one of said finger assemblies having a second element for engaging the surface being gaged at an intermediate location between said other two surface engaging elements, and means associated with said second surface engaging element for changing the position thereof relative to the said other elements.

11. The gaging means defined in claim 10 wherein said means for adjusting the position of said second surface engaging element includes means yieldably biasing said second element radially inwardly on said associated finger assembly, and cam means including a member movable longitudinally relative to said one finger assembly cooperatively engageable with said yieldable means and movable on said associated finger assembly to change the position of said second surface engaging element.

12. The gaging means defined in claim 10 wherein said opposed bore engaging elements are substantially in the same horizontal plane, one of said finger assemblies having a recess formed therein on the opposite side from the surface engaging element positioned thereon, the said other finger assembly being movable into said recess to minimize the space between the opposed surface engaging elements in certain positions thereof.

13. The gaging means defined in claim 10 wherein each of said finger assemblies includes means engageable with corresponding means on the associated mounting portions to accurately angularly orient said assemblies therein.

References Cited by the Examiner

UNITED STATES PATENTS

| | | | |
|---|---|---|---|
| 2,411,292 | 11/1946 | Rappl | 33—178 |
| 2,674,046 | 4/1954 | Kaye | 33—178 |
| 2,785,473 | 3/1957 | Sunnen | 33—178 |
| 3,067,520 | 12/1962 | Geraghty | 33—147 |

LEONARD FORMAN, *Primary Examiner.*

SAMUEL S. MATTHEWS, *Examiner.*